April 8, 1930.  J. J. NEVILLS  1,753,902
METHOD OF TREATING FRUITS AND VEGETABLES
Filed Feb. 5, 1927
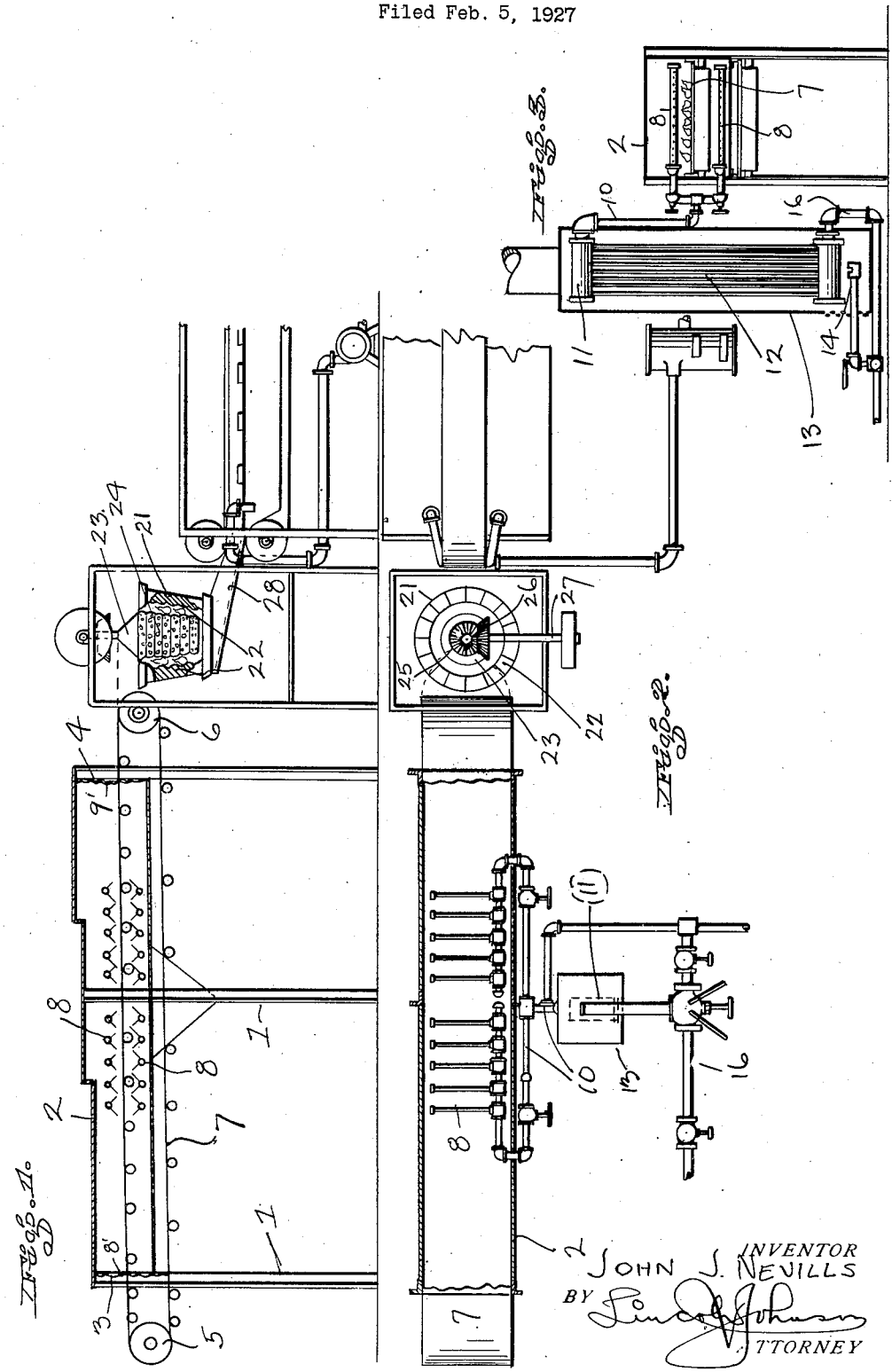

Patented Apr. 8, 1930

1,753,902

UNITED STATES PATENT OFFICE

JOHN J. NEVILLS, OF SACRAMENTO, CALIFORNIA

METHOD OF TREATING FRUITS AND VEGETABLES

Application filed February 5, 1927. Serial No. 166,177.

This invention relates particularly to an apparatus for and a method of treating the skins of fruits and vegetables in order to remove the skin therefrom.

An object of the invention is to provide an apparatus which will practice my process of removing the skins from fruits and vegetables, such as pears, tomatoes, and the like.

A further object of the invention is to provide an apparatus in which superheated steam having a temperature varying from 400° to 800° Fahrenheit may be brought into momentary contact with the skin of the fruit desired to be treated, to permit the skin so treated to be thereafter removed without injury or damage to the fruit.

In this specification and the annexed drawings, the invention is illustrated in the form considered to be the best, but it is to be understood that the invention is not limited to such form, because it may be embodied in other forms, and it is also to be understood that in and by the claim following the description, it is desired to cover the invention in whatsoever form it may be embodied.

Fig. 1 diagrammatically illustrates a longitudinal cross section through an apparatus adapted for use in accordance with the process of my invention.

Fig. 2 is a plan view of Fig. 1, being partly broken away to show the interior construction thereof.

Fig. 3 is a vertical cross section taken on the line 3—3 of Fig. 2.

In preparing some fruits and vegetables to be canned or packaged, it is a customary thing to remove the skin. Various means have been devised by which the skin on the fruit or vegetables may be treated and loosened so that its removal from the body of the fruit may be accomplished by hand or by machine. The peeling of the skin from pears presents a more difficult problem than that involved in the peeling of skin from any other kind of fruit or vegetable. Pears are a very delicate fruit and of necessity must be handled so as to prevent any discoloration which would come from rough usage, bruising and the like. I have found that by treating the skins of pears in the same fashion that tomatoes are treated, preparatory to peeling them, the pear is rendered unfit for market purposes. Under present canning practice, it has been found more economical to remove the skins from pears by peeling the same by hand. However, according to the process that I have evolved, a tender and delicate fruit such as pears may be subjected to contact with superheated steam of a temperature varying from 400° to 800° Fahrenheit, for a short period of time, and the action of the intense heat on the skin of the pear tends to loosen the skin from the body of the fruit without bruising or discoloring the said fruit so as to render it unmarketable. My process therefore involves the passing of the pears into contact with an intensely hot, dry, superheated steam for a period of time sufficient to loosen the skin on the body of the fruit and subsequently passing the fruit so treated into an apparatus which will assist in removing the treated skin from the body of the fruit. The skin is removed from the fruit either by rubbing or scraping it off either by hand or mechanically.

In detail, the construction illustrated in the drawings includes a frame 1 having a housing 2 supported thereon, which said housing is provided with an inlet 3 at one end thereof and an outlet 4 at the opposite end thereof. A pair of pulleys 5 and 6 are arranged adjacent each of the opposite ends of the housing 2, and around said pulleys an endless belt 7 passes. The upper half of the endless belt extends centrally through the housing 2, passing in the inlet 3 of said housing, and out the outlet 4 on said housing. The lower half of the endless belt passes beneath the under portion of the housing. A plurality of steam conduits 8 are arranged transversely across the housing 2, above and below the upper half of the endless belt 7 that passes through said housing. The conduits 8 above the belt are provided with openings therein so as to direct a flow of superheated steam down onto the upper surface of the belt, while the conduits 8 arranged beneath the said belt are provided with openings therein to direct a flow of superheated steam upwardly against the under side of the endless belt. The inlet and discharge ends of the housing 2 are closed by suitable curtains 8' and 9' to keep within the housing the heat discharged through the pipes 8.

The superheated steam conduits 8 are connected by a supply conduit 10 to a header pipe 11 on a superheater 12 that is mounted within the boiler 13. A suitably controlled burner 14 is provided beneath the superheater, to heat the steam that is passed into the superheater from the steam supply conduit 16. I have found that to peel the skin from pears it is not practical to subject the skin of the pears to contact with ordinary steam as the temperature thereof is not high enough to have the necessary loosening action on the pear skin. For that reason, I supply steam through the conduit 16 to the superheater and by means of a suitable flame, raise the temperature of the steam admitted to the superheater, to a temperature ranging from 400° to 800° Fahrenheit, after which it is discharged through the transverse conduits 8 in the casing 2 outwardly therefrom to heat whatever material may be on the endless belt passing through the housing 2. Although I have shown and described a particular type of steam chest and a conveyor passing therethrough, I do not wish to limit myself to the particular form shown, for the reason that it would be clearly within the scope of this invention to modify the form of the housing 2 or the means and method of injecting the heating medium therein.

The method of processing pears through my apparatus consists in first admitting superheated steam of a temperature that ranges from 400° to 800° Fahrenheit from the conduits 8 into the interior of the chest 2. I wish to emphasize that when I speak of steam in connection with the use of my process, I mean superheated steam that has a temperature over and above 400° Fahrenheit, as my process cannot be worked by using ordinary steam that has a temperature less than 400°. Ordinary wet steam may be practical for use in other processes to remove the skins from tomatoes, peaches and other fruits and vegetables, but it will not function to remove the skins from pears, so that the pears may be marketed thereafter. I have found that dry superheated steam having a temperature in excess of 400°, when momentarily applied to the outside of the pears, will have the effect of sufficiently loosening the skins thereof so that the same may be removed from the body of the fruit without injuring the fruit. After the temperature within the housing 2 reaches the desired point, the conveyor belt 7 passing therethrough is started moving, and the fruit to be treated is placed on the conveyor, adjacent the inlet end thereof. The endless belt moves at a predetermined rate of speed through the housing, so that the superheated steam only contacts with the articles on the said belt for a period of time sufficient to cause a separation between the skin around the fruit and the body of the fruit, whereby the said skin at a later time might be removed. The superheated steam contacts with the outside of the fruit so that it only penetrates and thoroughly cooks the skin, without injuring the body of the fruit. The rate of speed at which the conveyor will move varies with the particular fruit being treated. I have found that in order to successfully remove the skin from pears that the superheated steam should contact with the pears for a period of time varying anywhere from two to five seconds' time.

After the pears have been subjected to the action of the superheated steam and the skin on the pears has been sufficiently loosened, the fruit so treated is passed through the discharge end of the housing 2 and the fruit is tumbled into a mechanical peeling machine. This device consists of an open ended cylindrical casing 21 having its inner circumference lined with sponges 22 and provided with a rotary core 23 arranged concentrically therein, having the exterior thereof lined with sponges 24. The inner circumference of the sponge-lined casing is spaced from the sponge lined core to permit the passage of pears therethrough. The upper end of the core 23 is provided with a bevelled gear 25 thereon that meshes with a companion bevelled gear 26 mounted on a drive shaft 27. Pears that are fed into the top of the circular casing 21 are dropped into the space between the core and casing, and advanced through the casing, in contact with the sponge lining thereon, and discharged at the bottom of the casing, free and clear of all skin. From the peeling machine, the raw fruit is fed into suitable troughs 28 and the like where the fruit is cut up into sizes that will permit it to be cooked, canned or otherwise disposed of.

Having thus described this invention, what I now claim and desire to secure by Letters Patent is:

A method of removing the skins from pears consisting of holding the articles to be treated for a period of time varying from two (2) to five (5) seconds at a temperature varying from four hundred (400) to eight hundred (800) degrees, F., by means of a dry steam that will sear and loosen the skins of the articles without causing any injury thereto, and thereafter removing the loosened skins from the articles.

In testimony whereof, I have hereunto set my hand at San Francisco, California, this 17th day of January, 1927.

JOHN J. NEVILLS.